United States Patent
Meyuhas

(10) Patent No.: US 11,937,301 B2
(45) Date of Patent: Mar. 19, 2024

(54) DEVICES AND METHODS FOR WIRELESS COEXISTENCE MANAGEMENT

(71) Applicant: Intel Corporation, Santa Clara, CA (US)

(72) Inventor: Gil Meyuhas, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 17/356,531

(22) Filed: Jun. 24, 2021

(65) Prior Publication Data

US 2022/0417994 A1    Dec. 29, 2022

(51) Int. Cl.
*H04W 74/08* (2009.01)
*H04W 4/80* (2018.01)
*H04W 74/00* (2009.01)
*H04W 84/12* (2009.01)

(52) U.S. Cl.
CPC ......... *H04W 74/0816* (2013.01); *H04W 4/80* (2018.02); *H04W 74/008* (2013.01); *H04W 74/0891* (2013.01); *H04W 84/12* (2013.01)

(58) Field of Classification Search
CPC . H04W 74/0816; H04W 4/80; H04W 74/008; H04W 74/0891; H04W 84/12; H04W 72/1215; H04W 16/14; Y02D 30/70
See application file for complete search history.

(56) References Cited

U.S. PATENT DOCUMENTS

| | | | | |
|---|---|---|---|---|
| 2012/0170557 | A1* | 7/2012 | Tsfati | H04W 72/1215 370/338 |
| 2012/0182976 | A1* | 7/2012 | Thoukydides | H04W 72/1215 370/336 |
| 2014/0056288 | A1* | 2/2014 | Wyper | H04W 88/06 370/336 |
| 2016/0100400 | A1* | 4/2016 | Lu | H04W 56/0015 370/336 |
| 2021/0212118 | A1* | 7/2021 | Lu | H04W 76/15 |

FOREIGN PATENT DOCUMENTS

WO    WO-2021236304 A1 *   11/2021

* cited by examiner

Primary Examiner — Natasha W Cosme
Assistant Examiner — Yewon Kim
(74) Attorney, Agent, or Firm — Viering, Jentschura & Partner mbB

(57) ABSTRACT

Performing a synchronization to allow a second wireless communication circuit of a wireless device operating in a second wireless communication network to operatively coexist with a first wireless communication network of the wireless device operating in a first wireless communication network in one or more wireless communication channels according to a time division multiplexing (TDM), wherein the method includes determining whether the one or more wireless communication channels are busy comprising determining whether a packet has been detected by the wireless device in the one or more wireless communication channels and/or determining whether the wireless device has sensed energy in the one or more wireless communication channels when one or more back-off counters associated TDM plan is zero; and granting to the second communication network, in response to determining the one or more wireless communication channels are busy, use of the one or more wireless communication channels.

19 Claims, 9 Drawing Sheets

DEVICES AND METHODS FOR WIRELESS COEXISTENCE MANAGEMENT

TECHNICAL FIELD

Various aspects of this disclosure generally relate to systems, devices, and systems for managing wireless communications.

BACKGROUND

Current wireless co-existence (coex) Time Division Multiplexing (TDM) schemes operate by separating in time different wireless technologies in the same Network Interface Controller or Network Interface Card (NIC). For example, a NIC may include a WiFi (WF) circuit as well as a Bluetooth (BT), Wireless local area network (WLAN), LTE and/or any Wireless wide area network (WWAN), circuit for example. Some of wireless circuits, such as, for example, BT and LTE circuits, are agnostic to the WF congestion state or agnostic to any other channel busy indications such as WF Clear Channel Assessment (CCA) and Network Allocation Vector (NAV).

Wifi-Bluetooth (WF-BT) TDM coexistence mechanisms are currently planned and handled by the BT or WF scheduling requirements and use WF power-save (PS) protocol management capabilities to grant the BT circuit its TDM time without disturbing the WF by transmitting or receiving at other times.

However, because such TDM mechanisms are agnostic or unaware of the current WF congestion or channel busy which can induces time intervals that WF circuit would not use anyway, the NIC does not include a synchronized coexistence. That is, current coex mechanisms add to the complexity of the TDM scheme by being unaware of such channel indications and causes extra degradation to the WF circuit and communication by forcing the WF circuit to be absence or not operating in times were WF medium not busy. This adds to congestion that would have been allowed on the air or medium and adds to the overhead of WF PS management over-the-air (OTA).

WF PS intervals are limited by a lower bound of ~50 ms due to the nature of PS management requirements and/or PS overheads, therefore the coex mechanism cannot support Synchronous connection-oriented (SCO) links that can be buffered in time such as Hand Free Profile (HFP) for example, forcing the coex to use non TDM coex mitigations while in this state such as real-time arbitrations that has to stop/kill one of the wireless connections.

Moreover, when congestion in WF is large latency of voice/video (VO/VI) packets are very large, this worsens problems to the TDM coexistence mechanism because WF absences multiplies and produces latencies to a level that effects user-experience largely. For example, WF stand-alone with 10 stations (STAs) congestion already suffers latencies of ~100 ms for VO packets.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1A:
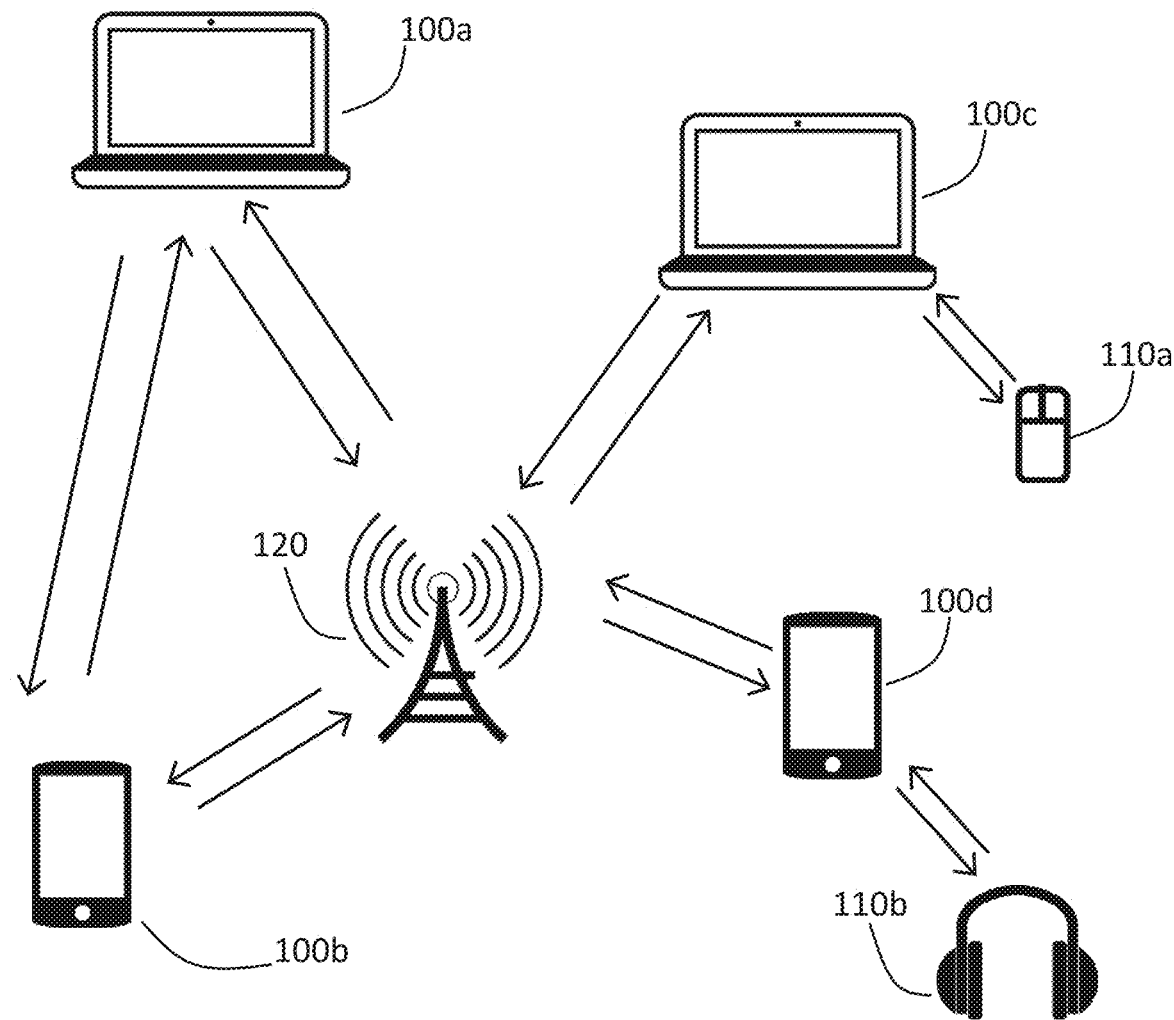
FIG. 1A shows an exemplary diagram illustrating an environment including computing devices.

The following detailed description refers to the accompanying drawings that show, by way of illustration, exemplary details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains fewer elements than the set.

The phrase "at least one of" with regard to a group of elements may be used herein to mean at least one element from the group, including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term "data" is not limited to the examples mentioned above and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit described herein may be realized as two (or more) separate entities with equivalent functionality, among others.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "send," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be regarded as referring to the transmit signal in baseband, intermediate, and radio frequencies.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

FIG. 1A shows an exemplary diagram illustrating an environment including computing devices 100a-d that communicate wirelessly with other devices or networks. Each of the computing devices 100a-d may implement one or more of various types communications protocols. In this example, the computing device 100a is a laptop that can wirelessly communicates with an access point 120 and another computing device 100b. The access point 120 may be WLAN router and the computing device 100 communicates using Wifi or WLAN protocols. In other cases, the access point 120 may be a base station and the computing device may communicate using a cellular protocol. In general, in the present disclosure, "access point (AP)", "wireless access point (WAP)", "base station," "base transceiver station", "Node B", "evolved Node B (eNode B or eNB)", and similar terminology, can be utilized interchangeably in the present disclosure, and refer to a wireless network component or apparatus that serves and receives data, control, voice, video, sound, gaming, or substantially any data-stream or signaling-stream from a set of wireless devices.

As shown, the computing device 100a communicates with the computing device 100b using a wireless communication technology or protocol, such as Bluetooth (BT) technology. The laptop 100c may also communicate using multiple wireless technologies. Specifically, the laptop 100c and the tablet 100*d* may communicate with the AP 120 and respectively with peripheral devices 110*a* (mouse) and 110*b* (headphones).

In short, the computing devices 100*a*-*d* may be any device including at least one processing circuit and configured to communicate wirelessly. Other computing devices may be any of a smartphone, a tablet device, a desktop or personal computer, a mobile phone, a laptop, a netbook computer, a workstation, a server, a mobile medical device, a camera, a wearable device, an Internet-of-Things (IoT) device, etc.

Figure 1B:
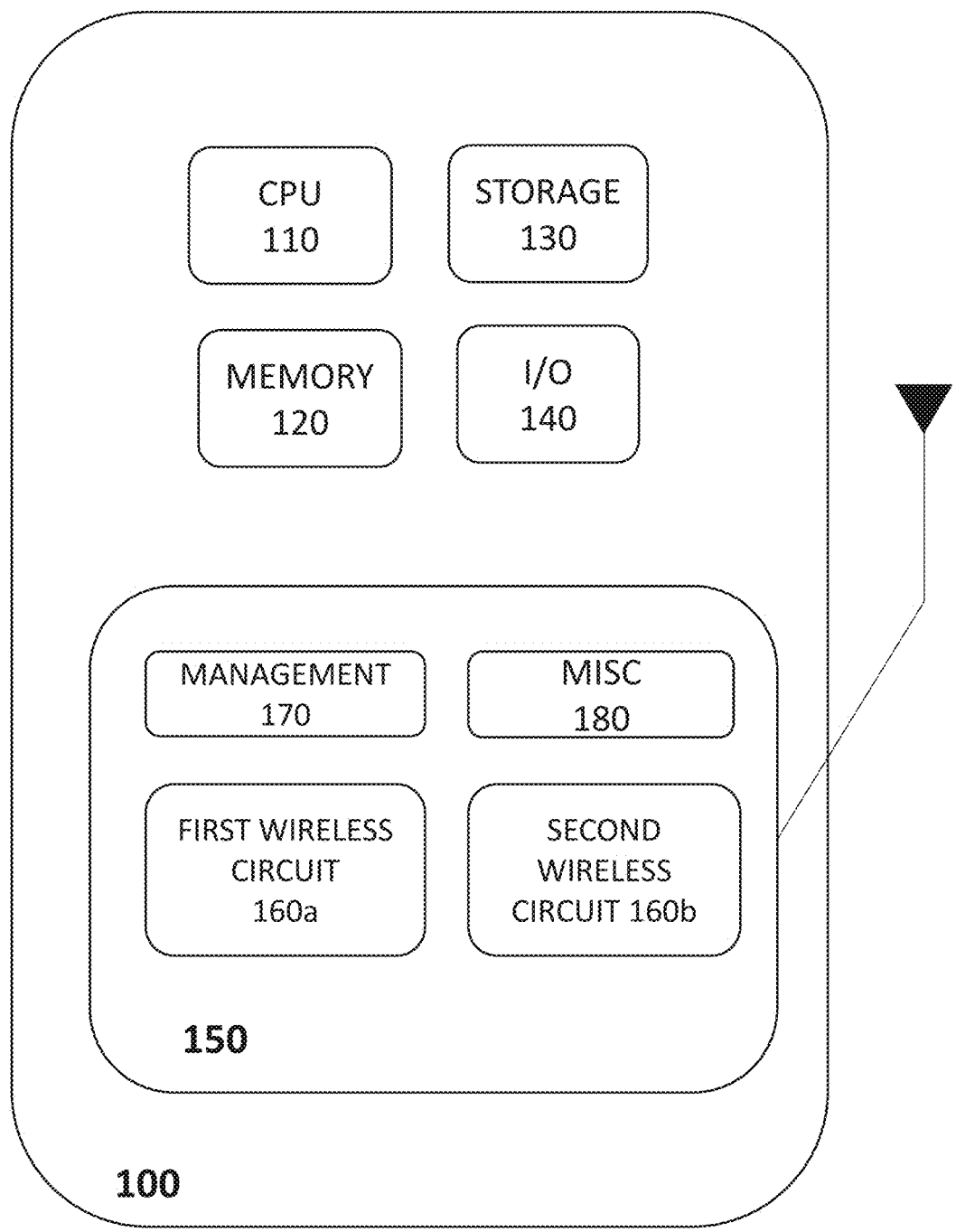
FIG. 1B shows an exemplary computing device including an exemplary network adaptor.

As shown in FIG. 1B, a computing device 100 can includes at least one processor, e.g., central processing unit (CPU) 110, and at least one memory device or unit 120, a storage device 130, and an I/O controller 140. Other components may not be depicted in FIG. 1B, such as display devices, peripheral devices such as a keyboard, mouse, etc. The storage device 130 can include, without limitation, an operating system, software, drivers, and/or applications. One or more applications 110 may be implemented or executed by the CPU 110.

The computing device 100 includes one or more data buses (not shown) to operably connect the various components of the computing device 100.

Further, the computing device can include a network adaptor 150 for communicating with other devices and networks. Using the network adaptor 150, the computing device can implement communications protocols or technologies to communicate with other entities. Accordingly, the computing device 100 can include or realize a network stack. The network stack 120 may include or realize layers but is not limited to layers of the Open Systems Interconnection model (OSI model). The computing device 100 may implement or realize some or all layers above the data link layer, including layer such as upper layers such as the network layer, transport layer, session layer, presentation layer, application layers. The computing device 100 may implement other protocols and may include TCP/IP layers. A network stack 120 can include queues filled to some extent with transmit/transmission data (Tx) or Tx packets and receive/reception (Rx) data or Rx packets.

The network adaptor 150 or network interface card or network interface controller (NIC) is capable of or configured to wirelessly transmit and receive data, e.g., packets of data to connect the computing device 100 to a computer networks or other devices.

The network adaptor 150 can include electronic components (e.g., hardware and/or software) for realizing communication and can implement a physical layer and a data link layer (e.g., including a Medium Access Control (MAC) layer). In the example of FIG. 1B, the network adaptor 150 can include components, e.g., wireless circuitry to communicate using a plurality of wireless communication protocols. Specifically, in FIG. 1B, the network adaptor 150 at least includes a first wireless communication circuit 160*a* and a second wireless communication circuit 160*b* or communication to communicate using a plurality of wireless communication protocols. The first wireless communication circuit 160*a* may implement a first wireless access technology or implement a first wireless communication protocol and the second wireless communication circuit 160 may implement a second wireless technology or implement a second communication protocol.

The second wireless technology or protocol can be different from the first wireless communication technology or protocol.

In one example, the first wireless communication circuit 160*a* may be a Wifi circuit configured to communicate (e.g., transmit and receive data) according to the Wifi communication protocol and the second wireless circuit 160*b* may be a Bluetooth circuit configured to communicate according to the Bluetooth communication protocol. This is merely exemplary as the first and second communication circuits 160*a* and 160*b* may include or implement other communication protocols including, for example, Long Term Evolution (LTE), including (LTE-Advanced (LTE-A); LTE-Unlicensed (LTE-U)); 3GPP; and IEEE 802.11x. Other cellular technologies may be used including without limitation (3G, 4G, 5G), or any other suitable wireless communication protocol or radio frequency based network protocol.

The network adaptor 150 may include a manager circuitry 170 responsible for managing or scheduling communication operations, e.g., transmission or reception by each of the wireless circuits. The manager circuitry or manager 170 may, for example, communicate with each of the first and wireless circuits 160*a* and 160. The manager 170 may be a component in the form of hardware and/or software (e.g., processor/controller executing instructions) for interfacing or communicating at least with the first and second wireless circuits 160*a* and 160*b*. The manager 170 may communicate with the first and second wireless circuits through real-time and/or non-real time types of interfaces.

The network adaptor 150 can be configured to implement a wireless coexistence mechanisms described herein. For example, in the case where the first wireless circuit 160*a* operates or communicates according to Wifi (WF) protocol and the second wireless circuit 160*b* operates or communicates with Bluetooth (BT) protocol, the network adaptor 150 may implement a Time Division Multiplexing (TDM) coexistence mechanism to allow both types of wireless technologies to efficiently coexist and function.

Figure 2:
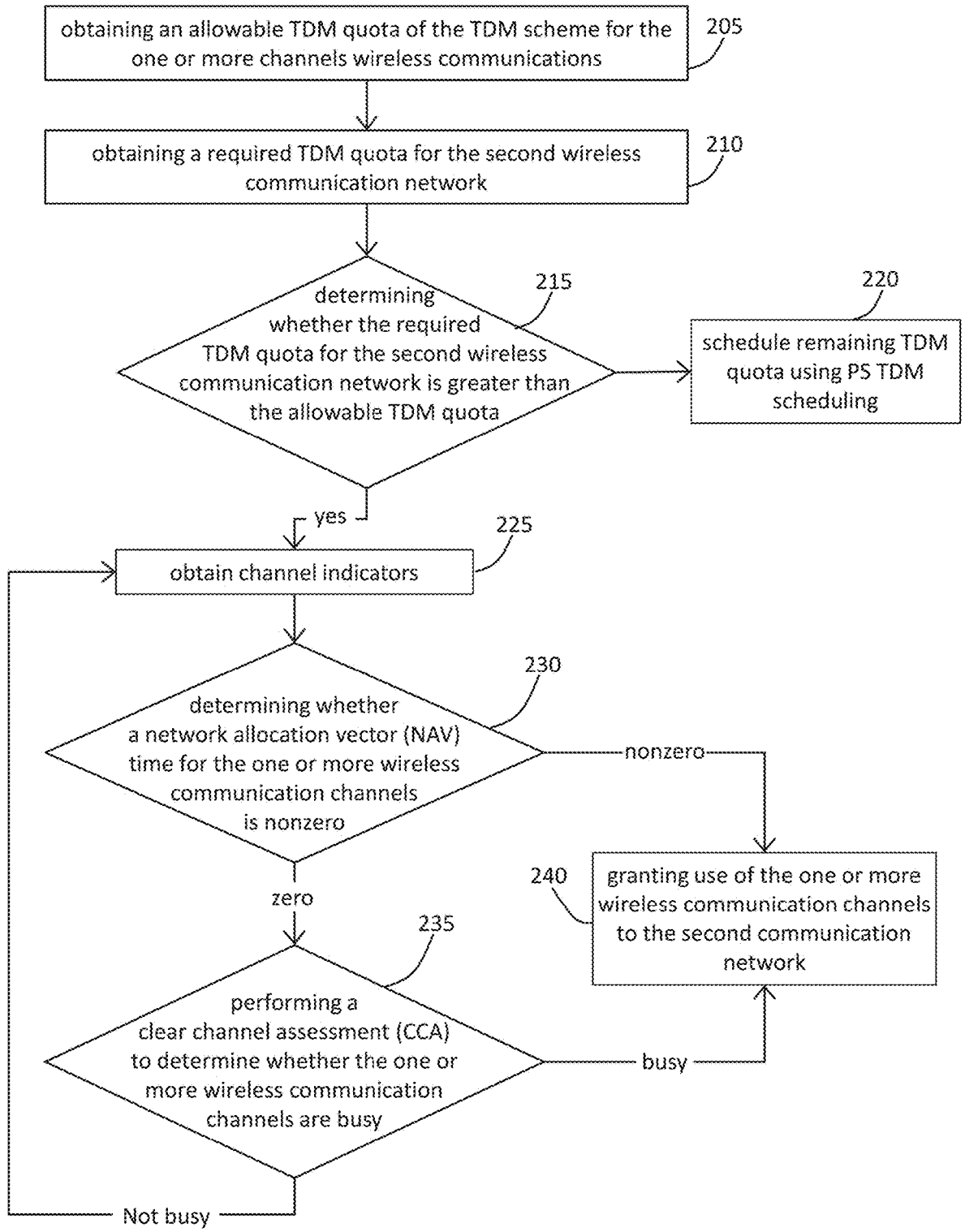
FIG. 2 shows an exemplary method for wireless coexistence according to at least one exemplary embodiment of the present disclosure.

FIG. 2 shows a flow diagram for a method 200 for implementing an exemplary wireless communication coexistence mechanism for at least two different wireless communication networks or protocols according to at least one exemplary embodiment of the present disclosure.

The method 200 may be performed by device such as the device 100 of FIG. 1B or another device with similar functionalities. The method 200 may be performed wholly or in part by a network adaptor, such as the network adaptor 150 in one example.

The method 200 can includes synchronizing the operation of a second wireless communication circuit so as to coexist with operation of a first wireless communication circuit that operates according to a Time Division Multiplexing (TDM) scheme or plan. The first wireless communication circuit implements a first type of wireless technology or protocol different than the protocol or technology implemented by for the second wireless communication circuit.

The method 200 can rely on the use of medium or channel statuses (e.g., channel busy or not busy) and medium/channel congestion levels.

In one example, where the first wireless network circuit 160*a* may be a Wifi circuit that operates according to a TDM plan. Wifi (WF) channel indicators, either all or part of them, combined with (real-time) WF channel status indications can used to allow a second wireless communication circuit to coexist and operate effectively with the first wireless communication circuit.

In one example, the second wireless communication network may be a Bluetooth circuit or WWAN/LTE circuit that can operatively coexist with the first (Wifi) network and with the WF medium.

The method 200 may synchronize operation of the second wireless communication circuit while maintaining the requirements for operation of the first wireless communication circuit.

In various embodiments, the first wireless communication circuit may be considered as a master in relation to the second wireless communication circuit and the first wireless communication network operates according to a TDM scheme.

The method 200 includes at 205, obtaining an allowable Time Division Multiplexing (TDM) quota for a TDM scheme for the one or more channels wireless communications. The allowable or induced TDM quota can indicate an amount of the one or more channels that can be granted to wireless communication networks or circuits other than the first wireless communication circuit, which includes the second wireless communication network or protocol. Said differently, the allowable or induced quota (later indicated as indNonWFquota) can be determined as the percentage of time per interval that can be granted to the secondary or non-primary coexisting connections (e.g., granted to the second wireless communication circuit) that would be busy as induced according to TDM plan for first wireless technology and its associated future estimated congestion, e.g., future Wifi congestion.

The allowable or induced TDM quota may be obtained from an internal component, such as a component that is configured to calculate or determine the allowable TDM quota. In particular, circuitry of the network adaptor 150 may be configured to determine and/or provide the allowable TDM quota.

Determining the allowable or induced TDM quota may rely on obtaining or determining a plurality of congestion related estimations. More specifically, determining the allowable TDM quota for the medium or the one or more wireless channels can include estimating a future congestion in the one or more wireless communication channels based at least in part on the measured congestion; and determining the allowable TDM quota for wireless communication networks other than the first wireless communication network based on the estimated future congestion, e.g., for the first wireless communication network in the one or more channels.

After obtaining the allowable TDM quota, the method can include at 210, obtaining a required or requested TDM quota for the second wireless communication network (of the network adaptor). The required TDM quota can indicate the amount of the medium (e.g., one or more channels) needed by the second communication network, e.g., for an upcoming time interval or period.

At 215, the method includes determining whether the required TDM quota for the second wireless communication network is greater than the allowable TDM quota. If the required TDM quota for the second wireless communication network is greater than the allowable TDM quota, then the method proceeds to 225.

At 225, the method includes obtaining one or more channel indicators for the one or more wireless communication channels. The channel indicators can include Network Allocation Vector (NAV) indicator (e.g., a NAV timer value or NAV timer).

After obtaining the channel indicators, the method proceeds to 230, and determining whether a network allocation vector (NAV) timer for the one or more wireless communication channels is nonzero.

If the NAV timer is nonzero, then the method proceeds to 240 and the method includes granting use of the one or more channels wireless communication to the second communication circuit(s). In this case, if the NAV time is nonzero, then the second communication circuits(s) is granted use of (e.g., transmission on) the one or more wireless communication channels for a remainder of the NAV timer associated with the TDM scheme for the first wireless communication circuit.

In other cases, where the NAV timer is determined to have a zero value, the method proceeds to 235 which includes performing a clear channel assessment (CCA) to determine whether the one or more wireless communication channels are busy. In a CCA, energy detected on the channel(s) is compared with the CCA parameter value to determine whether the channel is available or busy.

If, from the CCA, it is determined that one or more communication channels are busy, then the method proceeds to 240, which includes granting use of the one or more wireless communication channels to the second communication circuit. More specifically, the second communication network is granted use of the one or more channels wireless communication channels for a remainder of a back off (BO) time associated with the TDM scheme for the first wireless communication network.

If the CCA indicates that the one or more wireless communication channels are busy, then the method proceeds back to 225 to obtain an updated or next channel indicators.

If the CCA indicates that the one or more wireless communication channels are not busy, the process, e.g., from step 225 can be repeated. That is, in response to determining the one or more wireless communication channels are not busy, the method returns to 225 to await to obtain updated or new channel indicators and proceed onward to 230 and beyond.

FIG. 3 is exemplary flow diagram of a coexistence mechanism of a method 300 of the present disclosure. The method 300 may be considered a more detailed version of the method 200 of FIG. 3. The method 300 includes a process for synchronizing operation of a second wireless communication circuit to coexist with operation of a first wireless communication circuit operating according to a Time Division Multiplexing (TDM) scheme. The first wireless communication circuit may implement a first type of protocol or wireless technology different than the protocol or technology for the second wireless communication circuit.

In the example of FIG. 3, the first wireless communication circuit is a Wifi (WF) circuit and the second wireless communication circuit is a Bluetooth (BT) or WWAN/LTE circuit. However, in other cases, the first wireless circuit and second wireless circuit may be different types of wireless circuits.

A device, such as the device 100 of FIGS. 1A-1B may implement the method 300. Further, the method 300 may be implemented wholly or partially in the network adaptor or NIC. The network adaptor can include the first wireless circuit (e.g., a WF circuit) and the second wireless circuit (e.g., a BT and/or LTE circuit). In the method 300, the first wireless circuit can be considered as a master or primary circuit in relation to the second wireless circuit.

First, at 305, the an allowable TDM quota (indNonWFquota) or induced quota is determined. The allowable TDM quota or plan is the amount or capacity of the wireless channels determined according to, e.g., in a future interval, that could be allocated to a wireless network or protocol other than the first wireless network. The value indNonWFquota may be expressed in time, e.g., in milliseconds.

In at least one example, a device may include circuitry, e.g., in a network interface card, for at least the first wireless network, namely a first wireless circuit, and circuitry for a second wireless network (second wireless circuit). In short, the allowable TDM can indicate capacity in future that could be used by the second wireless network to communicate.

To determine the allowable TDM quota (indNonWF-quota), first a congestion or congestion level duty cycle (DC) for the medium or the one or more wireless communication channels is determined or measured at 310. The congestion level, congDC may be expressed in terms of percentage of interval time. In one example 60% congDC indicates that 60 is occupied by congestion, and thus the medium can be granted to other communication protocols or circuits.

A congestion estimation method can determine or estimate the congestion level DC (congDC) may be based on one or more of combination of calculations or determinations, using any appropriate weighting factors. In particular, the congestion estimation level, congDC, may be determined as a combination of following calculation or determinations:

Average total-back-off while Transmission/Transmit (Tx) First-In-First Out (FIFO) buffers (Tx-FIFOs) are not empty (AvgTotBo) vs an average backoff (BO) when channel is not busy (CWmin/2)
  wherein CW=contention window, and CWmin is the min time to wait for next attempt to access the medium
  wherein CWmin is the initial BO draw range [0 . . . CWmin] evenly distributed, so the average BO when channel is not busy is CWmin/2. A factor of waiting for transmission to access the channel can be given by the expression AvgTotBO/CWmin/2=2×AvgTotBO/CWmin Average of the time there is no transmission when transmit buffers, Tx-FIFOs, (e.g., in the NIC) are not empty Average channel-busy time (in the case where a CCA did find energy above energy-detect CCA-ED threshold). (ED=energy detection). CCA-ED is the ability of the receiver to detect non-WiFi energy in the operating channel and back off data transmission.

Average number of frame-not-for-us Received (Rx) from the same access point (AP) or base station (BSS) the NIC is associated with
  This calculation indicates the load of frames over the air that are not sent to us (the NIC), which is a direct indication of congestion
  A WF circuit will receive an WF protocol frame, and while parsing its header it will see that the destination address is not for it, but for another station Transmit buffer (Tx FIFO) input to output (in/out) ratio, or a gradient of FIFO buffer fullness level
  When there is more data input to FIFO buffer from the host/driver than the amount of data going out to Tx, this indicates there is a back pressure from channel not allowing the NIC to access the air. Or this indication can be derived from calculating the gradient of the FIFO buffer fullness level.
  Congestion determined by forcing a transmission (Tx) rate down, for the first wireless circuit, e.g., one rate down from a set or operating stable working rate, and checking amount of Packet Error Rate (PER)—if the PER is above a predefined or predetermined level it can indicate congestion due to collisions In response to forcing a transmission rate lowering from a stable working Tx rate, the PER should reduce because since lower Tx rate has generally better coding protection or lower modulation, or better Tx diversity, that can protect data of being lost by channel state or range. If the PER does not lower to a minimal certain expected value it means or indicates that the cause of PER is not channel state or noise, but rather congestion causing more collisions.

The above exemplary indication or calculations, or other similar indications can either detect congestion over-the-air (OTA) above a threshold limit, or can be used to detect or estimate the amount of collisions for an upcoming time period or interval. Certain channel conditions may require different accuracies for congestion estimations. Thus a weighted selection of the above indications can be used to derive the required or appropriate result.

Similarly, the above calculations or determination methods can be used to determine a corresponding congestion estimation error (CongestEstErr). That is, the congestion estimation error, CongestEstErr can indicate the level of congestion level within a range of uncertainty. While CongestEstErr is related to congestions aging (the more or longer time in the future to predict or estimate congestion, the higher the estimation error can be) The, and while congestion level changes are relatively slow in time and more in the order of few coex TDM intervals CongestEstErr can be maintained upper bounded.

Assuming that congestion level changes relatively slow in time and more in the order of the few coex TDM intervals, CongestEstErr can be expected to be limited, allowing coex TDM to use the congestion calculation as the estimated congestion level for the near future with an expected CongestEstErr.

Further in the method, a future congestion estimation max time (FutureEstMaxTime) may be defined or determined which indicates how much the coexisting mechanism (coex TDM) will be able to use future congestion estimations in terms of time (e.g., seconds) in the congestion measure 310. This may be defined or determined from the congestion measurement functions, such as the variance level of each measure. In one example, the FutureEstMaxTime may be determined by measuring the accuracy of the historical or previously made congestion estimations and calculate its error variance.

It may be assumed that congestion level changes occur relatively slow in time and more in the order of the few TDM intervals, and that CongestEstErr is expected to be limited.

Based on the congestion level, CongDC, the congestion error estimation, CongestEstErr, and the FutureEstMaxTime, the allowable quota or induced quota is determined. In the specific example of FIG. 3, this quota can be the induced quota for non-Wifi communication because the first/primary communication network is the Wifi circuit. The value of indNonWFquota can be further used in the method as shown in FIG. 3B.

Figure 3A:
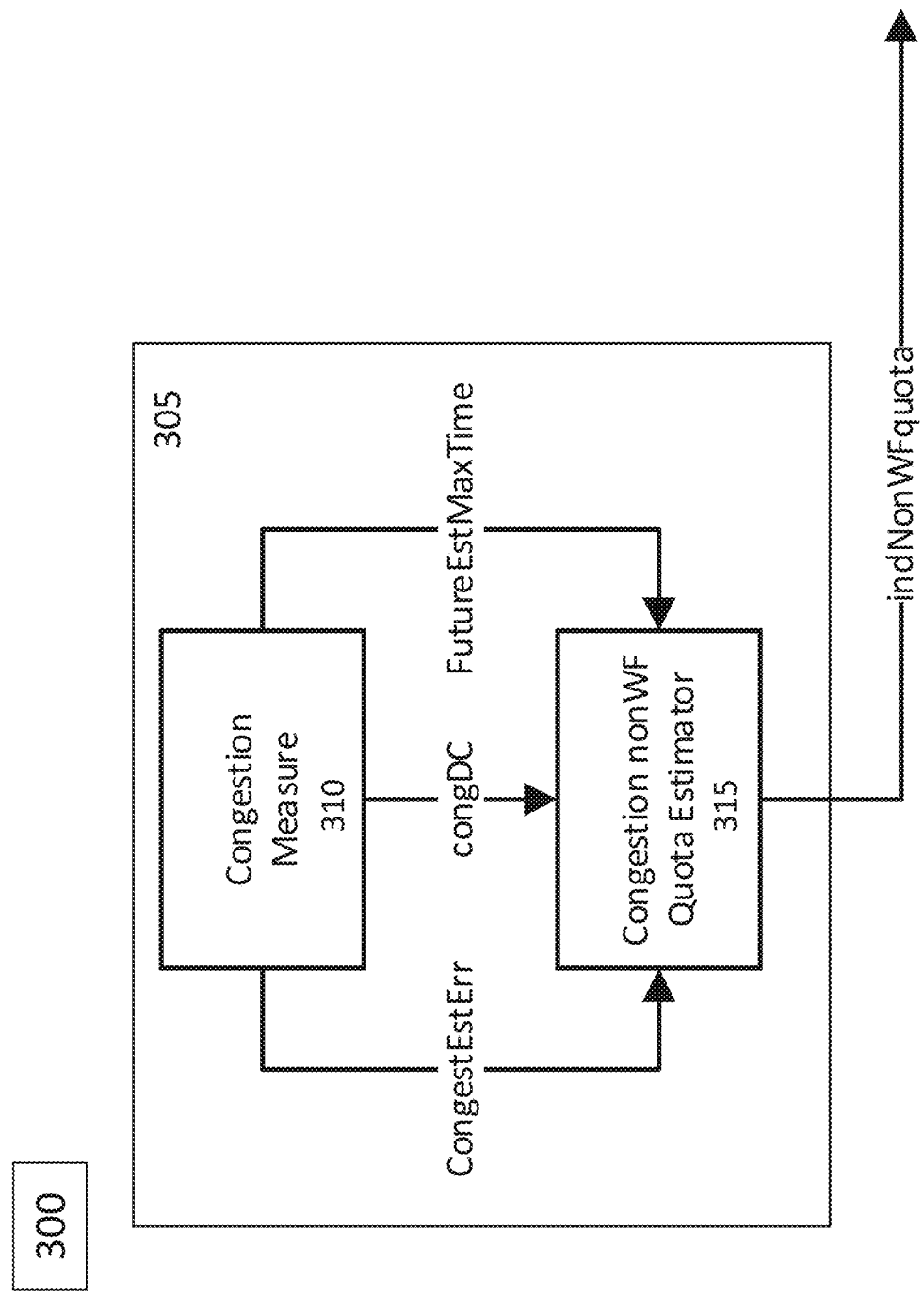
FIGS. 3A-3C another exemplary method for wireless coexistence according to at least one exemplary embodiment of the present disclosure.

The process of FIG. 3A may be considered as preliminary or optional part of the method 300 for implementing a coexistence mechanism. The calculation of the allowable TDM quota, indNonWFquota may occur automatically even in cases where a coexistence TDM mechanism is not necessarily needed. In general, the congestion estimation method described herein can be used to decide if there is additional TDM portion that has to be granted, e.g., in known ways, or according to a TDM plan.

Figure 3B:
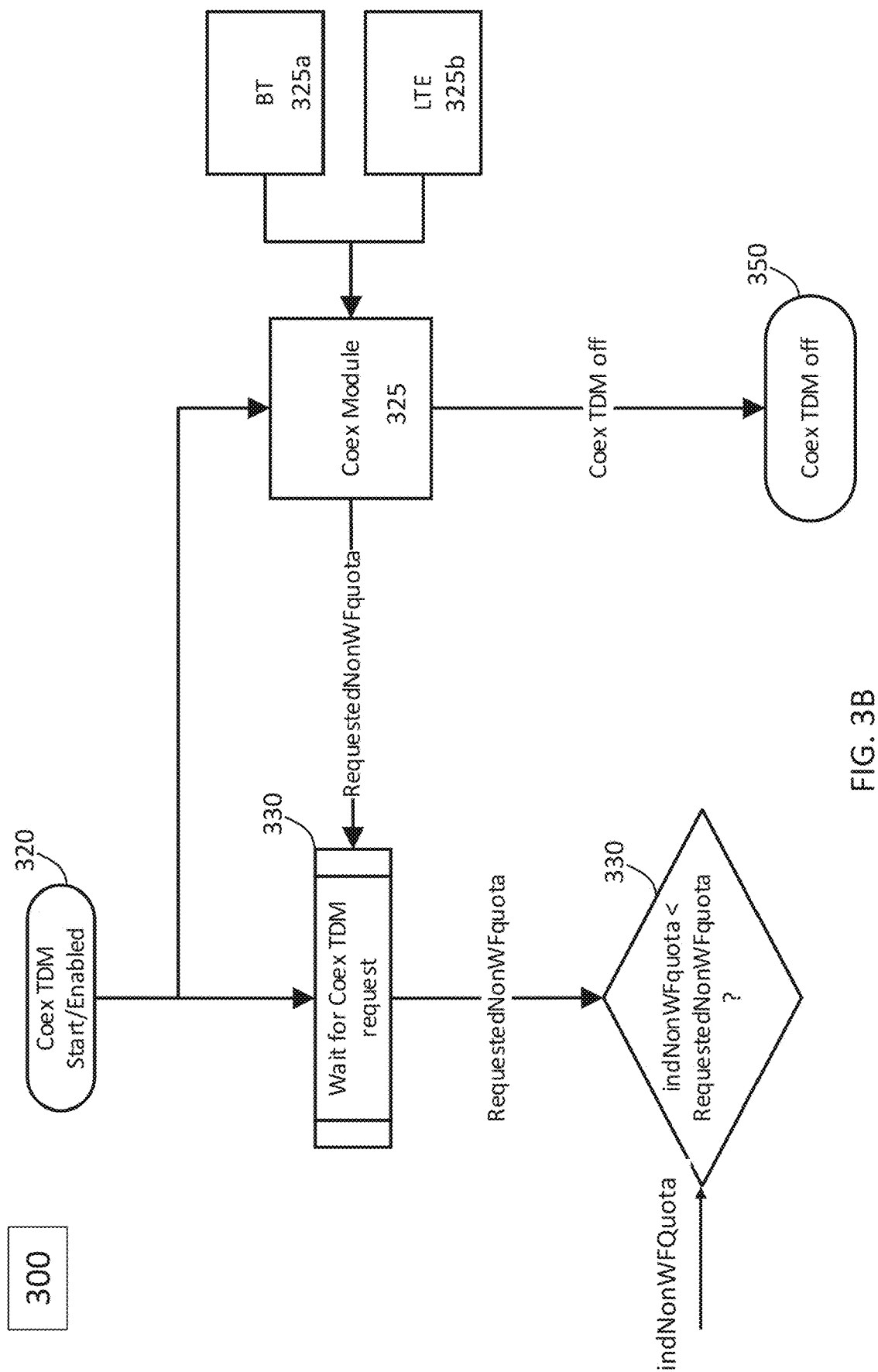

In the example of FIG. 3B, the method 300B includes at 320, enabling or starting a coexistence TDM mechanism. That is, the coex TDM mechanism may be automatically or selectively enabled in response to certain input or signals. For example, in some cases, the coex TDM mechanism may not be needed because there is only one wireless circuit operating, e.g., a Wifi circuit in the NIC and thus there no potential conflicts with the operation another secondary wireless circuit. Further, when the secondary network or circuit (e.g., Bluetooth, LTE, etc.) begins to operate, it may trigger, e.g., send a signal to a NIC manager, that activates the coex TDM mechanism.

As discussed, a network adaptor or NIC implementing the method may include more than one secondary wireless communication circuit. In this example of FIGS. 3A-3C, the NIC contains at least a Bluetooth circuit 325a and a LTE circuit 325. A coex module 325 may be circuitry in the network adaptor or NIC that interfaces with 3 the BT circuit 325a and the LTE circuit 325b. The coex module 325 may forward communications, e.g., data signals from the BT circuit 325a and LTE circuit 325 and the other components, e.g., network manager of the NIC. In some cases, the coex module 25 may be integrated with the NIC manager.

In FIG. 3B, the coex module 325 may send a request to use one or more wireless channels in response to requests received or obtained from the BT circuit 325a and/or the LTE circuit 325b. Requests for non-WF use of channels, e.g., for a non-Wifi quota (RequestedNonWFquota) can be received by a NIC manager or other component implementing the coex TDM mechanism. The request indicates a required or needed amount of the one or more wireless channels needed by the other or secondary wireless communication networks or circuits. After receiving the request at 330, the method includes comparing the requested quota (RequestedNonWFquota) to the allowable TDM quota.

Figure 3C:
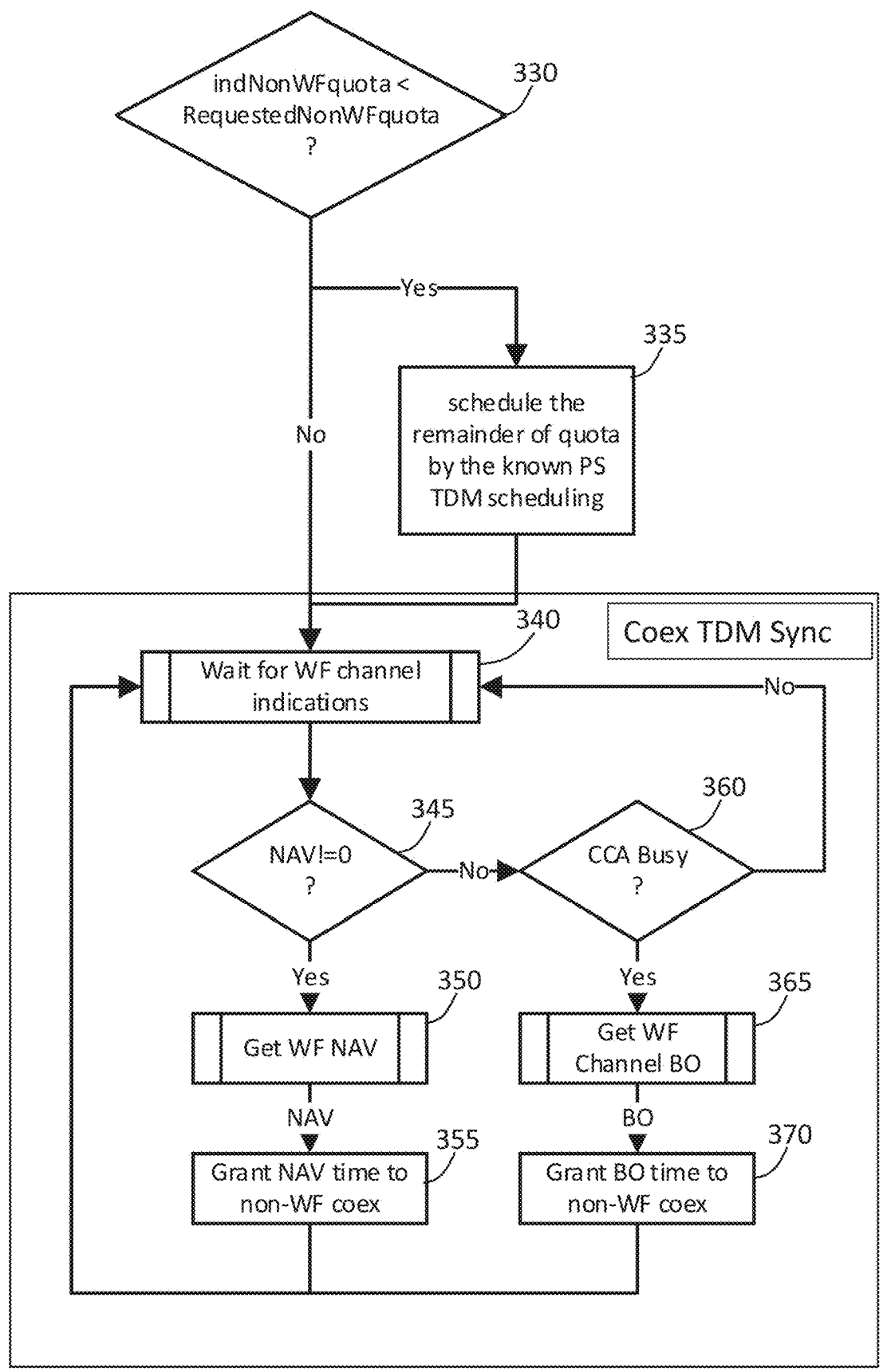

If the requested quota or required quota from the secondary communication circuits (RequestedNonWFquota) is not larger than the induced or allowable TDM quota (indNonWFquota), the method would proceed to further implement a coexistence mechanism, and in the example of FIG. 3C, would proceed to 340.

If the requested quota is greater or larger than the requested required quota (RequestedNon WFquota> indNonWFquota), then the method proceeds to 335, where scheduling for the remainder of the quota by known scheduling methods, e.g., by known Power Saving (PS) TDM scheduling methods. For example, Power Saving scheduling methods or techniques for Wifi include Automatic Power Saving Delivery (APSD). A wireless device or AP implementing APSD shall, if a station is using APSD and is in PS mode, temporarily buffer bufferable units (Bus) destined to that station. Another example is Target Wake Time (TWT) which enables wireless devices to determine when and how frequently they will wake up to send or receive data. Essentially, this allows 802.11ax access points to effectively increase device sleep time and significantly conserve battery.

Again, if the requested quota is NOT greater than to the induced quota (indNonWFquota>RequestedNonWFquota), then method proceeds to implement the coexistence mechanism (Coex TDM Sync). Thus, at 340, the method includes waiting for and obtaining network indicators (e.g., WF indicators in this example). The indicators can include Network Allocation Vector (NAV) time.

Using the obtained indicators such as NAV indicators, the method includes at 345 determining whether the NAV timer is currently nonzero.

If the NAV timer value is nonzero, the method proceeds to 350 where the remaining time in the NAV timer is determined or ascertain and then granted, at 355, to the second wireless circuit for use on the medium or one or more wireless channels. After granting use of the medium for the remainder of the NAV timer, the Coex TDM Sync process may repeat.

In cases where the NAV timer is determined to have a value of zero, then the method proceeds to 360, which includes performing a CCA to determine whether the one or more wireless channels where the first wireless network is operating are busy or occupied. If the channels are determined not to be busy, the process can return to 340 to wait and obtain a next set of channel indicators for the first wireless network. If the medium or one or more wireless channels is determined to be busy by the performed CCA, then at 365 the current back off (BO) is determined or ascertained. Next the one or more wireless channels are granted to the secondary network or secondary circuits (e.g., the BT and/or the LTE circuits) for the remainder of the BO time.

The coexistence TDM synchronization mechanisms or methods described herein can be performed by a network adaptor, including by the manager of the network adaptor and/or other suitable components. Such circuitry may be in the form of hardware circuitry and/or software (e.g., processing circuitry) that execute instructions to implement the execution of the method in the network adaptor.

Figure 4:
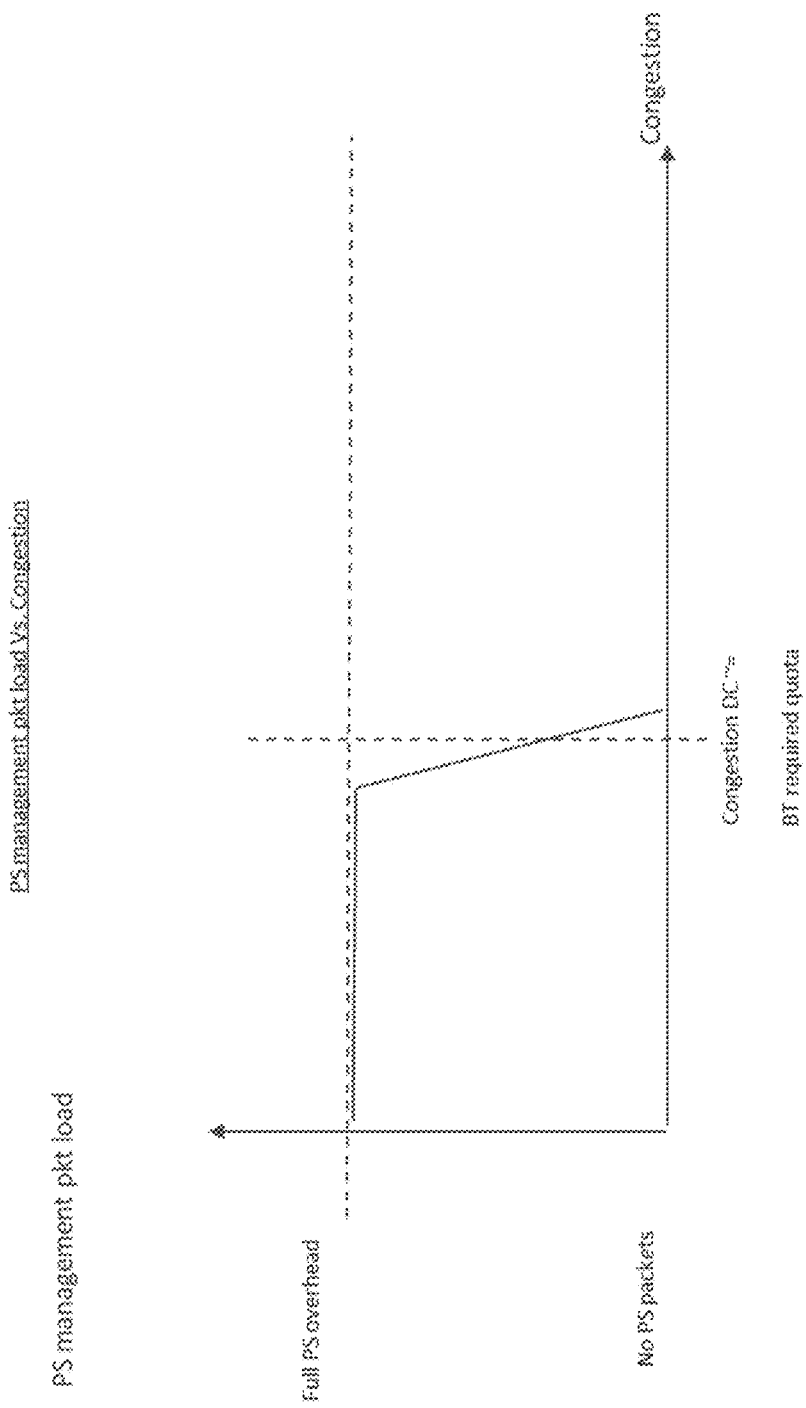
FIG. 4 shows an exemplary graph that qualitatively illustrates the amount power-saved from the use of the TDM coex mechanisms according to at least one exemplary embodiment of the present disclosure.

FIG. 4 is an exemplary graph that qualitatively illustrates the amount power-saved from the use of the TDM coex mechanisms or methods described herein compared to the amount of PS management packets overhead used for coex TDM versus the congestion level. As the congestion level for the medium gets higher or worse, the less PS methods are used. The solid line in FIG. 4 indicates the use of PS methods against congestion level. When the congestion level DC gets to the required coex TDM quota (indicated by the vertical dashed line) there is no need for PS managed TDM and all TDM quota can be handled by the induced WF channel busy time.

Figure 5:
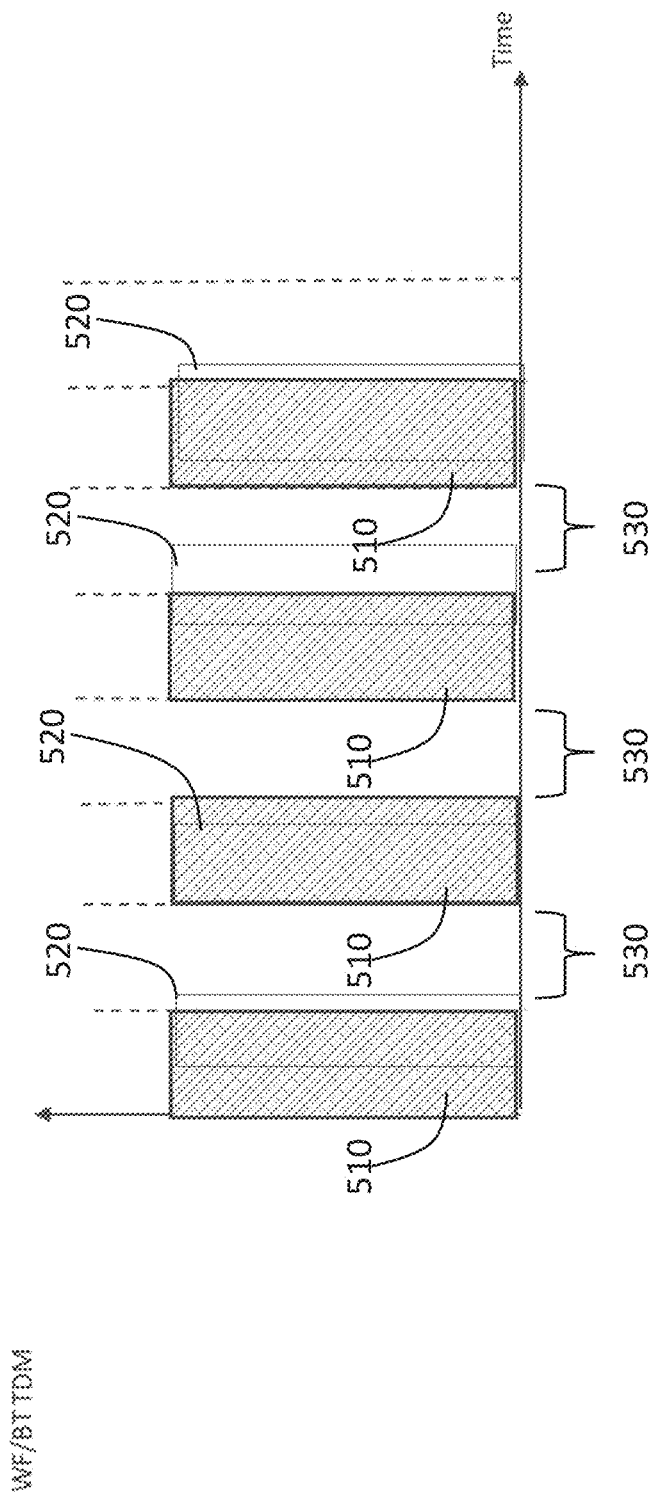
FIG. 5 shows includes an exemplary graph that shows access in a Time Division Multiplexing scheme for a medium by both a Wifi circuit and a Bluetooth circuit over time.

FIG. 5 is an exemplary graph that shows the relationship between use of coex TDM of WF/BT vs Time, with and without the method described herein.

The pattern filled bars 510 represent the Congestion Induced WF time for a primary or first wireless network (e.g., WF). Namely these are the times where a first wireless network or circuit (e.g., WF circuit/network) can access the medium or channel(s) because since the medium is available and not busy.

The empty or transparent solid bars 520 represent a secondary network scheduled by TDM (e.g., BT TDM) without using the TDM coex mechanism or methods described herein. The bars are depicted as overlapping or overlaying the shaded bars to indicate that the TDM scheduling or TDM plan for the secondary network can be agnostic to WF congestion and busy status may schedule BT communication at times were WF may access its channel, thus causing collision and performance degradation.

The white gaps 530 located between the bars are TDM slots given to WF in times were WF channel is considered busy. These slots, without using the TDM coex methods or mechanisms described herein are wasted because none of coexistence networks (first or secondary wireless networks) are using these time slots. Thus, according to methods described herein, the second wireless circuits can access and use the medium at the white gaps, which are determined based on real indications (NAV, CCA, BO counters), which can tell (exactly) when to grant the medium to other communication circuits or protocols, which can be predicted or estimated based on current congestion levels.

Figure 6:
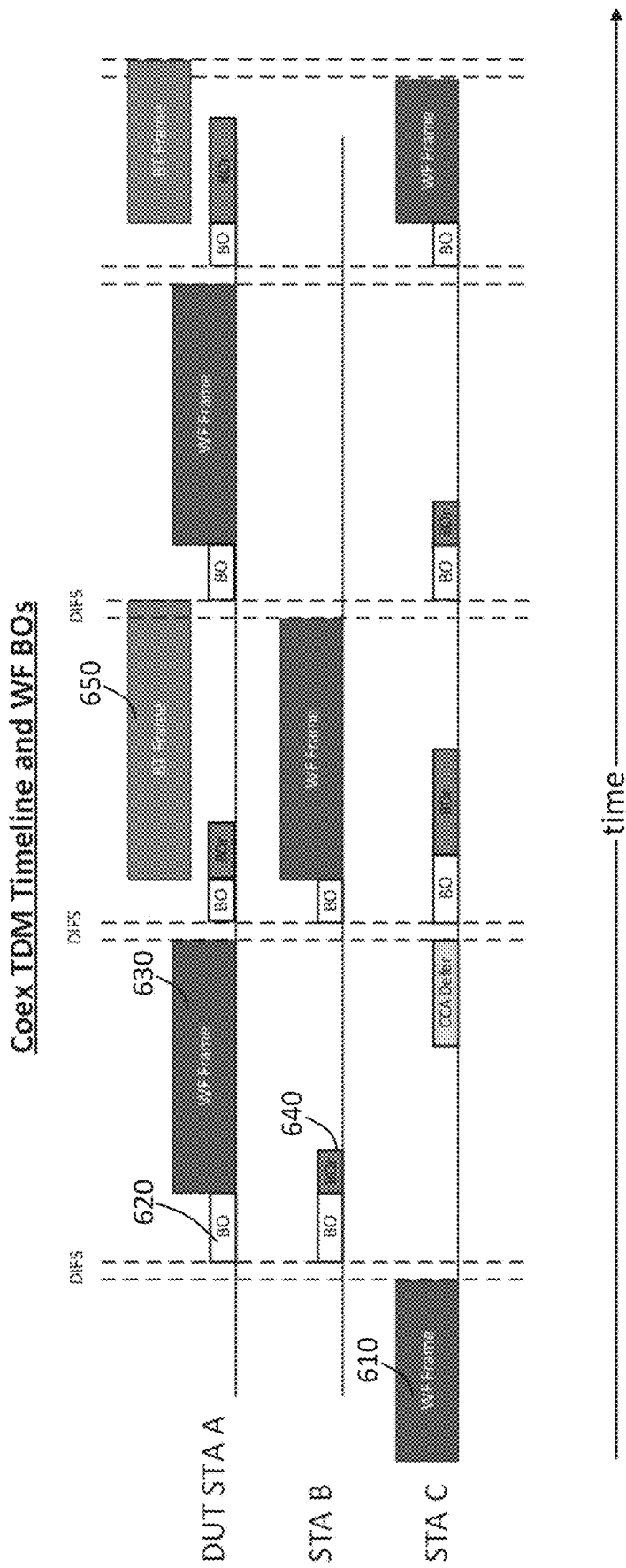
FIG. 6 is a graph timeline of frames in a wireless network to show a Time Division Multiplexing coexistence operating relatively to backoffs.

FIG. 6 is a graph timeline of frames in a wireless network to show a coexistence TDM mechanism described herein operating relatively to Wifi BOs. The example of FIG. 6 includes three separate wireless access points or stations (STAs). A device under test (DUT) may communicate with only the first station, STA A. The stations STAs A-C may each support Wifi communication.

The DUT can include a network adaptor or network interface card (NIC) described herein that can implement the TDM coex mechanisms described herein. As such, the NIC can include a primary wireless circuit, namely a Wifi circuit in this example and a secondary wireless circuit, e.g., a BT circuit in this example.

As shown in FIG. 6, the WF stations STA B and STA C are causing congestion. In FIG. 6 BO is the time already waited (reduced from timer), BOr is the remaining backoff time, and CCA defer is energy in the air due to other stations' packets that are not detected, a performed CCA will show this.

During a first frame or time period, a transmission frame is sent to or from the station STA C. After a spacing time, (DCF Interframe spacing (DIFS) time), the WF circuit of the DUT (DUT WF) requests to transmit to station STA A and waits according to a BO time (620). The DUT wins the medium (e.g., one or more wireless channels) and thus transmits in the second frame (WF Frame 630). At same time, the second station, STA-B, also wants to access the medium. However, the second station, STA B, has larger backoff time 640 and thus must refrain from transmitting during the second frame.

At the end of the second frame, the DUT wants to transmit, to station STA A, but it loses the medium for the third frame to STA-B WF. This is because the backoff time, after the DIFS, is larger than the BO for the station STA B. Thus, STA B wins the medium DUT's and its NAV time is set to last this end of the third frame. Thus until the end of the third frame, the condition that NAV timer is nonzero (NAV!=0) can trigger the coex TDM mechanism described herein. During this, the coex TDM described herein can grant this remaining NAV time to DUT's secondary wireless circuit, e.g., the BT circuit. Thus the DUT can transmit a frame 650 via BT during the third frame or third period.

The presented method improves the use of wireless coexistence implementations by being aware to a first or primary wireless network (e.g., WF) air busy indications and (e.g., WF) congestion level indications. In the examples herein, a coexistence TDM quota or quota plan can be pre-planned with a portion of coex quota can be handled by the suggested methods herein. In general, the methods include synchronizing a secondary wireless circuit to coexistence with a medium in which a first wireless network (e.g., WF) operates on a medium according to a TDM scheme.

The methods described herein can improve a primary circuit (e.g., WF) throughput and latencies by allowing the medium to be available in times were there is high probability for it to access the medium. The methods described herein reduce over-the-air overhead for coexistence implementations and reduce channel collisions by being available at times were PHY headers for the first wireless network are being transmitted in air. The methods also allow a first wireless network to improve its cell density by not wasting non-busy medium or air-time on other coex wireless connections. In general, the methods allow other wireless connections to coexist with better performance when a medium used by a first wireless technology medium is congested.

In the following, various aspects of the present disclosure will be illustrated in the following examples:

Example 1 is a non-transitory computer readable medium having instructions that when executed by processing circuitry of a wireless device cause the processing circuitry to perform, for one or more iterations, a synchronization to allow a second wireless communication circuit of the wireless device operating in a second wireless communication network to operatively coexist with a first wireless communication network of the wireless device operating in a first wireless communication network in one or more wireless communication channels according to a time division multiplexing (TDM) plan, wherein to perform the synchronization includes causing the processing circuitry to:

determine whether the one or more wireless communication channels are busy including to determine whether a packet has been detected by the wireless device in the one or more wireless communication channels and to determine, if a packet has not been detected, whether the wireless device has sensed energy in the one or more wireless communication channels when one or more back-off counters associated TDM plan is zero;

in response to determining the one or more wireless communication channels are busy, grant, to the second communication network, use of the one or more wireless communication channels.

Example 2 is the subject matter of Example 1, wherein to determine whether a packet has been detected by the wireless device in the one or more wireless communication channels may include to determine whether a network allocation vector (NAV) time for the one or more wireless communication channels is nonzero.

Example 3 is the subject matter of Example 2, wherein to determine whether the wireless device has sensed energy in the one or more wireless communication channels when one or more back-off counters associated TDM plan is zero, may include to perform a clear channel assessment (CCA) to determine whether the one or more wireless communication channels are busy.

Example 4 is the subject matter of Example 3, wherein to grant, to the second communication network, use of the one or more channels wireless communication channels may include to:

grant, to the second wireless communication network in response to determining the NAV time being nonzero, use of the one or more wireless communication channels for use for a remainder of the NAV time; and grant, to the second wireless communication network in response to determining the one or more wireless communication channels are busy by the performed CCA, use of the one or more channels wireless communication channels for a remainder of a back off (BO) time.

Example 5 is the subject matter of Example 4, wherein the instructions may further cause the processing circuitry to perform the synchronization in response to receiving one or more channel availability indicators for the one or more channels.

Example 6 is the subject matter of any of Examples 1 to 5, wherein instructions may further cause the processing circuitry to: in response to determining by the NAV time being zero and determining by the performed CCA that the one or more channels are free, perform the synchronization again.

Example 7 is the subject matter of any of Examples 1 to 6, wherein the first wireless communication network may include a wireless local area network (WLAN) or Wi-Fi network.

Example 8 is the subject matter of any of Examples 1 to 7, wherein the second wireless communication network may include a Bluetooth network.

Example 9 is the subject matter of any of Examples 1 to 8, wherein the second wireless communication network may be a wireless wide area network (WWAN) network.

Example 10 is the subject matter of any of Examples 1 to 9, wherein the instructions may further cause the processing circuitry to obtain an allowable TDM quota of the TDM scheme for the one or more channels wireless communications, the allowable TDM quota indicating an amount of the one or more channels can be granted to wireless communication networks other than the first wireless communication networks; obtain a required TDM quota for the second wireless communication network, the required TDM quota indicating an amount of the one or more channels needed by the second communication network for an upcoming time interval; and determine whether the required TDM quota for the second wireless communication network is greater than the allowable TDM quota.

Example 11 is the subject matter of Example 10, wherein the instructions may further cause the processing circuitry to perform the synchronization in response to determining the required TDM quota for the second wireless communication network is greater than allowable TDM quota.

Example 12 is the subject matter of Example 10, wherein the instructions may further cause the processing circuitry to schedule a remainder of the allowable quota in the upcoming interval to be allocated to the second wireless communication network according to the TDM scheme.

Example 13 is the subject matter of Example 12, wherein the instructions may further cause the processing circuitry to schedule the remainder of the allowable quota in the upcoming interval to the second wireless communication network using one or more Power Saving (PS) techniques so as to allow absence of use of the one or more wireless communication channels by the first wireless communication network while granting use of the one or more wireless communication channels by the second wireless communication circuit.

Example 14 is the subject matter of Example 10, wherein instructions may further cause the processing circuitry to obtain an allowable TDM quota of the TDM scheme for the one or more wireless communication channels comprises the processing circuitry further caused to determine the allowable TDM quota, including to: determine congestion in the one or more wireless communication channels; estimate a future congestion in the one or more wireless communication channels based at least in part on the measured congestion; and determine the allowable TDM quota for wireless communication networks other than the first wireless communication network based on the estimated future congestion in the one or more channels.

Example 15 is the subject matter of Example 14, wherein to determine congestion in the one or more wireless communication channels may include the processing circuitry further being caused to determine one or more congestion indicators, including the processing circuitry to: determine an average total-back-off while a transmission first-in-first-out buffers (Tx-FIFOs) are not empty and determine an average back-off when the one or more channels channel is not busy; determine an average time no transmission is occurring when no transmission by the first wireless network occurs and when the Tx-FIFOs are not empty; determine an average channel-busy time for the one or more channels; determine an input to output ration for the Tx FIFO; and/or determine a packet error rate (PER) after a stable working rate of the first wireless communication network is forced one rate down and compare the determined PER to a predefined threshold.

Example 1A is a method for performing a synchronization to allow a second wireless communication circuit of a wireless device operating in a second wireless communication network to operatively coexist with a first wireless communication circuit of the wireless device operating in a first wireless communication network in one or more wireless communication channels according to a time division multiplexing (TDM) plan, wherein the method includes: determining whether the one or more wireless communication channels are busy comprising determining whether a packet has been detected by the wireless device in the one or more wireless communication channels and/or determining whether the wireless device has sensed energy in the one or more wireless communication channels when one or more back-off counters associated TDM plan is zero; and granting to the second communication network, in response to determining the one or more wireless communication channels are busy, use of the one or more wireless communication channels.

Example 2A is the subject matter of Example 1A, wherein determining whether a packet has been detected by the wireless device in the one or more wireless communication channels can include determining whether a network allocation vector (NAV) time for the one or more wireless communication channels is nonzero.

Example 3A is the subject matter of Example 2A, wherein determining whether the wireless device has sensed energy in the one or more wireless communication channels when one or more back-off counters associated TDM plan is zero can include performing a clear channel assessment (CCA) to determine whether the one or more wireless communication channels are busy.

Example 4A is the subject matter of Example 3A, wherein granting to the second communication network use of the one or more wireless communication channels can include:
  granting use of the one or more wireless communication channels for use for a remainder of the NAV time in response to determining the NAV time is nonzero; or
  granting use of the one or more wireless communication channels for use or a remainder of a back off (BO) time of the TDM plan in response to determining the one or more wireless communication channels are busy according to the performed CCA.

Example 5A is the subject matter of Example 4A, which may further include performing the synchronization in response to receiving one or more channel availability indicators for the one or more channels.

Example 6A is the subject matter of any of Examples 1A to 5A, which may further include, in response to determining by the performed CCA that the one or more channels are free, performing the synchronization again.

Example 7A is the subject matter of any of Examples 1A to 6A, wherein the first wireless communication network may be a wireless local area network (WLAN) or Wi-Fi network.

Example 8A is the subject matter of any of Examples 1A to 7A, wherein the second wireless communication network may be a Bluetooth network.

Example 9A is the subject matter of an of Examples 1A to 8A, wherein the second wireless communication network may be a wireless wide area network (WWAN) network.

Example 10A is the subject matter of any of Examples 1A to 9A, which may further include:
  obtaining an allowable TDM quota of the TDM scheme for the one or more channels wireless communications, the allowable TDM quota indicating an amount of the one or more channels can be granted to wireless communication networks other than the first wireless communication networks;

obtaining a required TDM quota for the second wireless communication network, the required TDM quota indicating an amount of the one or more channels needed by the second communication network for an upcoming time interval; and determining whether the required TDM quota for the second wireless communication network is greater than the allowable TDM quota.

Example 11A is the subject matter of Example 10A, wherein the synchronization may be performed in response to determining the required TDM quota for the second wireless communication network is greater than allowable TDM quota.

Example 12A is the subject matter of Example 10A, which may further include scheduling a remainder of the allowable quota in the upcoming interval to be allocated to the second wireless communication network according to the TDM scheme.

Example 13A is the subject matter of Example 12A, which may further include scheduling the remainder of the allowable quota in the upcoming interval to the second wireless using one or more Power Saving (PS) techniques so as to allow absence of use of the one or more wireless communication channels by the first wireless communication network while granting use of the one or more wireless communication channels by the second wireless communication circuit.

Example 14A is the subject matter of Example 10A, wherein obtaining an allowable TDM quota of the TDM scheme for the one or more wireless communication channels can include: determining a congestion level in the one or more wireless communication channels; estimating a future congestion level in the one or more wireless communication channels based at least in part on the measured congestion; and determining the allowable TDM quota for wireless communication networks other than the first wireless communication network based on the estimated future congestion in the one or more channels.

Example 15A is the subject matter of Example 14A, wherein determining congestion in the one or more wireless communication channels can include determining an average total-back-off while a transmission first-in-first-out buffers (Tx-FIFOs) are not empty and determine an average back-off when the one or more channels channel is not busy; determining an average time no transmission is occurring when no transmission by the first wireless network occurs and when the Tx-FIFOs are not empty; determining an average channel-busy time for the one or more channels; determining an input to output ration for the Tx FIFO; and/or determining a packet error rate (PER) after a stable working rate of the first wireless communication network is forced one rate down and compare the determined PER to a predefined threshold.

Example 1B is a wireless device comprising one or more processors coupled to an interface of a first wireless circuit operating in a first wireless communication network in one or more wireless channels according to a time division multiplexing (TDM) pan, and to an interface of a second wireless circuit operating in a second wireless communication network, the one or more processors configured to cause the wireless device to perform the example or method of any of Examples 1A to 15A.

Example 2B is the subject matter of Example 1B wherein the interface of the first wireless circuit is the same or different from the interface of the second wireless circuit.

Example 1C is a wireless device comprising: a first wireless communication network means operating in one or more wireless channels according to a time division multiplexing (TDM) plan; a second wireless communication network means for operating in a second wireless communication network; means for performing a synchronization to allow the second wireless communication network means to operatively coexist with the first wireless communication network means in the one or more wireless communication channels, wherein the means for performing the synchronization further includes:

means for determining whether a network allocation vector (NAV) time for the one or more wireless communication channels is nonzero;

means for granting to the second wireless communication network means, use of the one or more wireless communication channels for use for a remainder of the NAV time in response to the NAV time being nonzero grant, grant, to the second wireless communication network;

means for performing a clear channel assessment (CCA) for determining whether the one or more wireless communication channels are busy, in response to determining the NAV time being zero; and means for granting to the second communication network in response to determining the one or more wireless communication channels, use of the one or more channels wireless communication channels for a remainder of a back off (BO) time.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. A non-transitory computer readable medium having instructions that when executed by processing circuitry of a wireless device causes the processing circuitry to:

perform, for one or more iterations, a synchronization to allow a second wireless communication circuit of the wireless device operating in a second wireless communication network to operatively coexist with a first wireless communication circuit of the wireless device operating in a first wireless communication network in one or more wireless communication channels according to a time division multiplexing (TDM) plan, wherein to perform the synchronization comprises causing the processing circuitry to:
- determine whether the one or more wireless communication channels are busy comprising to determine whether a packet has been detected by the wireless device in the one or more wireless communication channels and
- in response to determining a packet has not been detected, determine whether the wireless device has sensed energy in the one or more wireless communication channels when one or more back-off counters associated with the TDM plan is zero;
- in response to determining the one or more wireless communication channels are busy, grant, to the second communication circuit, use of the one or more wireless communication channels, wherein to grant, to the second communication network, use of the one or more channels wireless communication channels comprises to grant, to the second wireless communication network in response to determining a network allocation vector (NAV) time being nonzero, use of the one or more wireless communication channels for use for a remainder of the NAV time.

2. The non-transitory computer readable medium of claim 1, wherein to determine whether a packet has been detected by the wireless device in the one or more wireless communication channels comprises to determine whether a network allocation vector (NAV) time for the one or more wireless communication channels is nonzero.

3. The non-transitory computer readable medium of claim 2, wherein to determine whether the wireless device has sensed energy in the one or more wireless communication channels when one or more back-off counters associated with the TDM plan is zero, comprises to perform a clear channel assessment (CCA) to determine whether the one or more wireless communication channels are busy.

4. The non-transitory computer readable medium of claim 3, wherein to grant, to the second communication network, use of the one or more channels wireless communication channels comprises to:
- grant, to the second wireless communication network in response to determining the one or more wireless communication channels are busy by the performed CCA, use of the one or more channels wireless communication channels for a remainder of a back off (BO) time.

5. The non-transitory computer readable medium of claim 4, further causing the processing circuitry to:
- perform the synchronization in response to receiving one or more channel availability indicators for the one or more channels.

6. The non-transitory computer readable medium of claim 2, further causing the processing circuitry to:
- in response to determining by the NAV time being zero and determining by the performed CCA that the one or more channels are free, perform the synchronization again.

7. The non-transitory computer readable medium of claim 1, wherein the first wireless communication network is a wireless local area network (WLAN) or Wi-Fi network.

8. The non-transitory computer readable medium of claim 1, wherein the second wireless communication network is a Bluetooth network.

9. The non-transitory computer readable medium of claim 1, wherein the second wireless communication network is a wireless wide area network (WWAN) network.

10. The non-transitory computer readable medium of claim 1, further causing the processing circuitry to:
- obtain an allowable TDM quota of the TDM scheme for the one or more channels wireless communications, the allowable TDM quota indicating an amount of the one or more channels can be granted to wireless communication networks other than the first wireless communication networks;
- obtain a required TDM quota for the second wireless communication network, the required TDM quota indicating an amount of the one or more channels needed by the second communication network for an upcoming time interval;
- determine whether the required TDM quota for the second wireless communication network is greater than the allowable TDM quota.

11. The non-transitory computer-readable medium of claim 10, the processing circuitry is further caused to perform the synchronization in response to determining the required TDM quota for the second wireless communication network is greater than allowable TDM quota.

12. The non-transitory computer-readable medium of claim 10, the processing circuitry is further caused to schedule a remainder of the allowable quota in the upcoming interval to be allocated to the second wireless communication network according to the TDM scheme.

13. The non-transitory computer readable medium of claim 12, wherein the processing circuitry is further caused to schedule the remainder of the allowable quota in the upcoming interval to the second wireless communication network using one or more Power Saving (PS) techniques so as to allow absence of use of the one or more wireless communication channels by the first wireless communication network while granting use of the one or more wireless communication channels by the second wireless communication circuit.

14. The non-transitory computer readable medium of claim 10, wherein the processing circuitry is further caused to obtain an allowable TDM quota of the TDM scheme for the one or more wireless communication channels comprises the processing circuitry further caused to determine the allowable TDM quota, comprising:
- determine congestion in the one or more wireless communication channels;
- estimate a future congestion in the one or more wireless communication channels based at least in part on the determined congestion; and
- determine the allowable TDM quota for wireless communication networks other than the first wireless communication network based on the estimated future congestion in the one or more channels.

15. The non-transitory computer readable medium of claim 14, wherein to determine congestion in the one or more wireless communication channels comprises the processing circuitry further being caused to determine one or more congestion indicators, comprising the processing circuitry to:
- determine an average total-back-off while a transmission first-in-first-out buffers (Tx-FIFOs) are not empty and determine an average back-off when the one or more channels channel is not busy;
- determine an average time no transmission is occurring when no transmission by the first wireless network occurs and when the Tx-FIFOs are not empty;

determine an average channel-busy time for the one or more channels, or determine an input to output ration for the Tx FIFO;

determine a packet error rate (PER) after a stable working rate of the first wireless communication network is forced one rate down and compare the determined PER to a predefined threshold.

16. A method for performing a synchronization to allow a second wireless communication circuit of a wireless device operating in a second wireless communication network to operatively coexist with a first wireless communication circuit of the wireless device operating in a first wireless communication network in one or more wireless communication channels according to a time division multiplexing (TDM) plan, wherein the method comprises:

determining whether the one or more wireless communication channels are busy comprising determining whether a packet has been detected by the wireless device in the one or more wireless communication channels, or determining whether the wireless device has sensed energy in the one or more wireless communication channels when one or more back-off counters associated with the TDM plan is zero; and granting to the second communication circuit, in response to determining the one or more wireless communication channels are busy, use of the one or more wireless communication channels, wherein determining whether a packet has been detected by the wireless device in the one or more wireless communication channels comprises determining whether a network allocation vector (NAV) time for the one or more wireless communication channels is nonzero, and wherein determining whether the wireless device has sensed energy in the one or more wireless communication channels when one or more back-off counters associated with the TDM plan is zero comprises performing a clear channel assessment (CCA) to determine whether the one or more wireless communication channels are busy.

17. The method of claim 16, wherein granting to the second communication network use of the one or more wireless communication channels comprises:

granting use of the one or more wireless communication channels for use for a remainder of the NAV time in response to determining the NAV time is nonzero; or granting use of the one or more wireless communication channels for use or a remainder of a back off (BO) time of the TDM plan in response to determining the one or more wireless communication channels are busy according to the performed CCA.

18. A wireless device comprising:

one or more processors coupled to an interface of a first wireless circuit operating in a first wireless communication network and to an interface of a second wireless circuit operating in a second wireless communication network, the one or more processors configured to:

perform a synchronization to allow the second wireless communication circuit of a wireless device to operatively coexist with the first wireless communication network scheduled in one or more wireless communication channels according to a time division multiplexing (TDM), wherein to perform the synchronization comprises the one or more processors to:

determine whether a network allocation vector (NAV) time for the one or more wireless communication channels is nonzero;

in response to the NAV time being nonzero grant, grant, to the second wireless communication network, use of the one or more wireless communication channels for use for a remainder of the NAV time;

in response to determining the NAV time being zero, perform a clear channel assessment (CCA) to determine whether the one or more wireless communication channels are busy; and in response to determining the one or more wireless communication channels are busy by the performed CCA, grant, to the second communication network, use of the one or more channels wireless communication channels for a remainder of a back off (BO) time.

19. The wireless device of claim 18, wherein the first wireless communication network comprises a wireless local area network (WLAN) or Wi-Fi network and wherein the second wireless communication network comprises a Bluetooth network.

* * * * *